US009937955B2

(12) United States Patent
Ueda et al.

(10) Patent No.: US 9,937,955 B2
(45) Date of Patent: Apr. 10, 2018

(54) VEHICLE CONTROLLER (71) Applicant: DENSO CORPORATION, Kariya, Aichi-pref. (JP)

(72) Inventors: Yusuke Ueda, Nishio (JP); Junichiro Funabashi, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 109 days.

(21) Appl. No.: 15/055,728

(22) Filed: Feb. 29, 2016

(65) Prior Publication Data

US 2016/0257342 A1 Sep. 8, 2016

(30) Foreign Application Priority Data

Mar. 2, 2015 (JP) .................................. 2015-040406

(51) Int. Cl.
*B62D 15/02* (2006.01)

(52) U.S. Cl.
CPC .................................. *B62D 15/026* (2013.01)

(58) Field of Classification Search
CPC .............................. B62D 15/026; B62D 15/02
See application file for complete search history.

(56) References Cited

U.S. PATENT DOCUMENTS

2014/0229068 A1* 8/2014 Ueyama ............. B62D 15/0255
701/41
2015/0088382 A1* 3/2015 Obuchi .................. B60K 31/00
701/41

FOREIGN PATENT DOCUMENTS

JP 2005-332192 A 12/2005

* cited by examiner

*Primary Examiner* — Yonel Beaulieu
*Assistant Examiner* — Martin A Weeks
(74) *Attorney, Agent, or Firm* — Harness, Dickey & Pierce, P.L.C.

(57) ABSTRACT

A vehicle controller includes a follow travel instructor conducting a lead vehicle follow control by auto-steering for a following of an own vehicle to follow a lead vehicle, an other vehicle information obtainer obtaining transmitted information transmitted from the lead vehicle, the transmitted information including information regarding a front situation of the lead vehicle, and an across-boundary move determiner determining whether the lead vehicle may cross a traffic lane boundary to an opposite traffic lane, based on the front situation information of the lead vehicle obtained by the other vehicle information obtainer. The follow travel instructor stops conducting the lead vehicle follow control based on a determination by the across-boundary move determiner that the lead vehicle may cross the traffic lane boundary. In such manner, an occupant of the own vehicle is prevented from becoming frightened by the auto-steering.

11 Claims, 9 Drawing Sheets

VEHICLE WIDTH:
NARROW

FIG. 7B

VEHICLE WIDTH:
WIDE

FIG. 8A

SIDE SHIFT AMOUNT:
SMALL

FIG. 8B

SIDE SHIFT AMOUNT:
LARGE

VEHICLE CONTROLLER

CROSS REFERENCE TO RELATED APPLICATION

The present application is based on and claims the benefit of priority of Japanese Patent Application No. 2015-040406, filed on Mar. 2, 2015, the disclosure of which is incorporated herein by reference.

TECHNICAL FIELD

The present disclosure generally relates to a vehicle controller that performs an auto-steering control.

BACKGROUND INFORMATION

Conventionally, an auto-steering control guides an own vehicle to travel on a target travel path by setting a target point based on an image of a traveling road in front from a camera on the own vehicle, and by determining the target travel path to lead to the target point.

However, the setting of the target point in the above-described technique may be hindered when the own vehicle comes close to a lead vehicle. That is, when the own vehicle comes close to the lead vehicle, the traveling road in front of the own vehicle is covered by the lead vehicle. Thus the traveling road is not sufficiently captured by the camera as an image, making it difficult to set the target point.

Thus, to resolve such a problem, a technique disclosed, for example, in a patent document, JP 2005-332192 A (patent document 1) uses an auto-steering control that controls the own vehicle to follow the lead vehicle, when the own vehicle comes close to the lead vehicle. More practically, the technique in patent document 1 sets the target travel path to lead to the position of the lead vehicle, which is set as the target point, for guiding the own vehicle by the auto-steering to travel on the target travel path when the own vehicle comes close to the lead vehicle.

However, the technique in the patent document 1 guides the own vehicle to follow the lead vehicle, even when the lead vehicle crosses a traffic lane boundary to an opposite traffic lane. This means that the own vehicle also crosses the traffic lane boundary to move into and travel in the opposite traffic lane at an unexpected timing of an occupant in the own vehicle, which may frighten the occupant. Further, as a result of crossing the traffic lane boundary to move into the opposite traffic lane, the own vehicle may come close to the on-coming vehicle, which may also frighten the occupant of the own vehicle.

SUMMARY

It is an object of the present disclosure to provide a vehicle controller that hardly frightens an occupant of an own vehicle when performing an auto-steering of the own vehicle to follow a lead vehicle.

In an aspect of the present disclosure, a vehicle controller disposed in an own vehicle includes a follow travel instructor conducting a lead vehicle follow control by auto-steering the own vehicle to follow a lead vehicle, an other vehicle information obtainer obtaining transmitted information that includes front situation information that allows for a determination of whether it is likely for the lead vehicle to cross a traffic lane boundary to an opposite traffic lane, the transmitted information being transmittable from the lead vehicle via a vehicle-to-vehicle communication, and an across-boundary move determiner determining whether it is likely for the lead vehicle to cross the traffic lane boundary to the opposite traffic lane, based on the front situation information of the lead vehicle obtained by the other vehicle information obtainer. The follow travel instructor stops conducting the lead vehicle follow control based on a determination by the across-boundary move determiner that it is likely for the lead vehicle to cross the traffic lane boundary.

According to the above, based on the information including the front situation information which allows a determination of possibility (i.e., whether the lead vehicle crosses a traffic lane boundary across to an opposite traffic lane), the across-boundary move determiner determines whether it is possible for the lead vehicle to cross the traffic lane boundary across to the opposite traffic lane. Therefore, a possibility of the lead vehicle to cross the lane boundary to move into the opposite traffic lane is determinable. Further, based on a determination of the across-boundary move determiner which has determined that it is possible for the lead vehicle to cross the lane boundary, the follow travel instructor stops conducting the lead vehicle follow control. Therefore, even when the lead vehicle crosses the lane boundary, the own vehicle is controlled not to cross the lane boundary. Thus, the unintentional move of the own vehicle to go into the opposite traffic lane at an unexpected timing of the occupant of the own vehicle due to the follow control of the own vehicle is prevented. Also, the own vehicle is prevented from coming close to the on-coming vehicle due to such control. As a result, the occupant of the own vehicle is hardly frightened by the auto-steering.

BRIEF DESCRIPTION OF THE DRAWINGS

Objects, features, and advantages of the present disclosure will become more apparent from the following detailed description made with reference to the accompanying drawings, in which.

DETAILED DESCRIPTION

First Embodiment

<Configuration of a Drive Support System 100>

Figure 1:
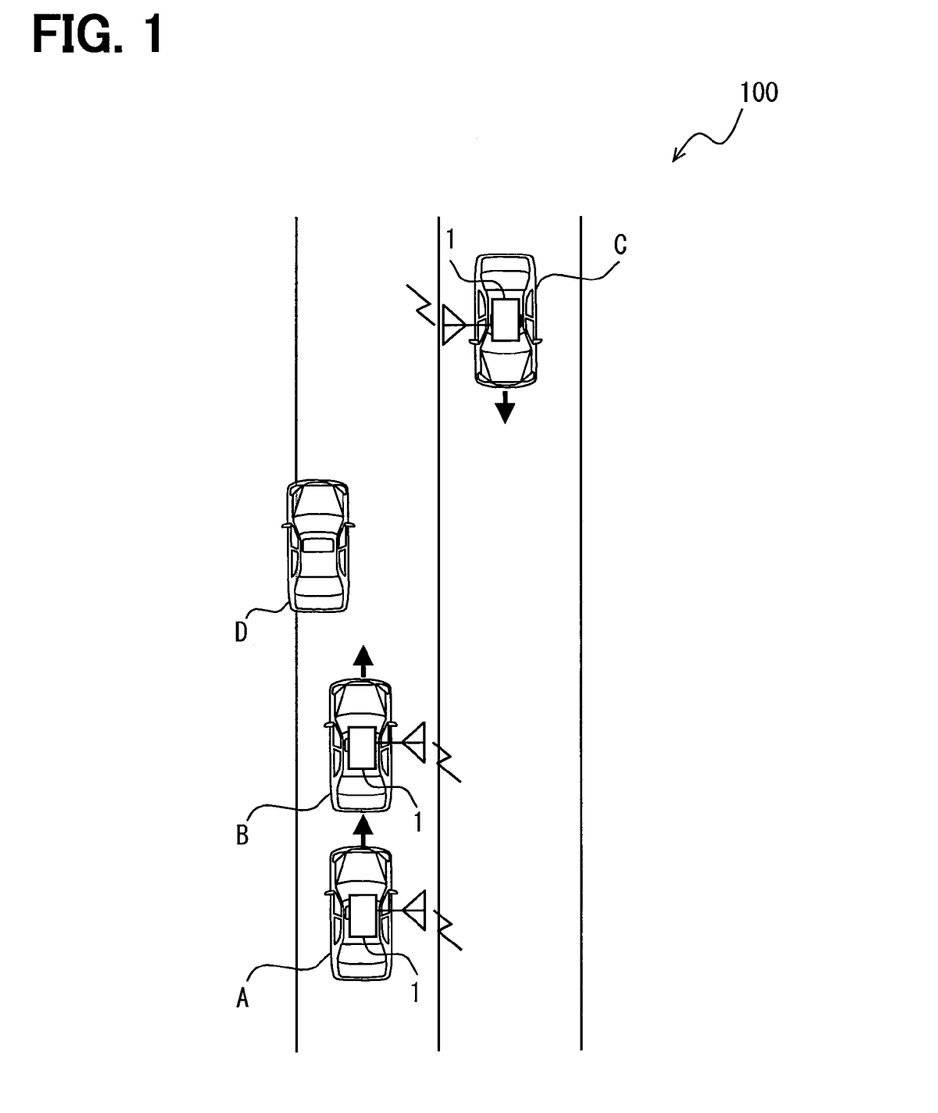
FIG. 1 is an illustration of a configuration of a drive support system.

An embodiment of the present disclosure is described with reference to the drawings. FIG. 1 is an illustration of an example of a configuration of the drive support system 100 to which the present disclosure is applied. The drive support system 100 shown in FIG. 1 includes a drive support unit 1 used in each of plural vehicles (see vehicles A to C of FIG. 1). An arrow in FIG. 1 shows a travel direction of each of the vehicles A to C. The vehicle B is a lead vehicle of the vehicle A, and the vehicle C is an on-coming vehicle of the vehicles A and B, and the vehicle D is a parked vehicle in a traveling road of the vehicles A and B.

<Configuration of the Drive Support Unit 1>

Figure 2:
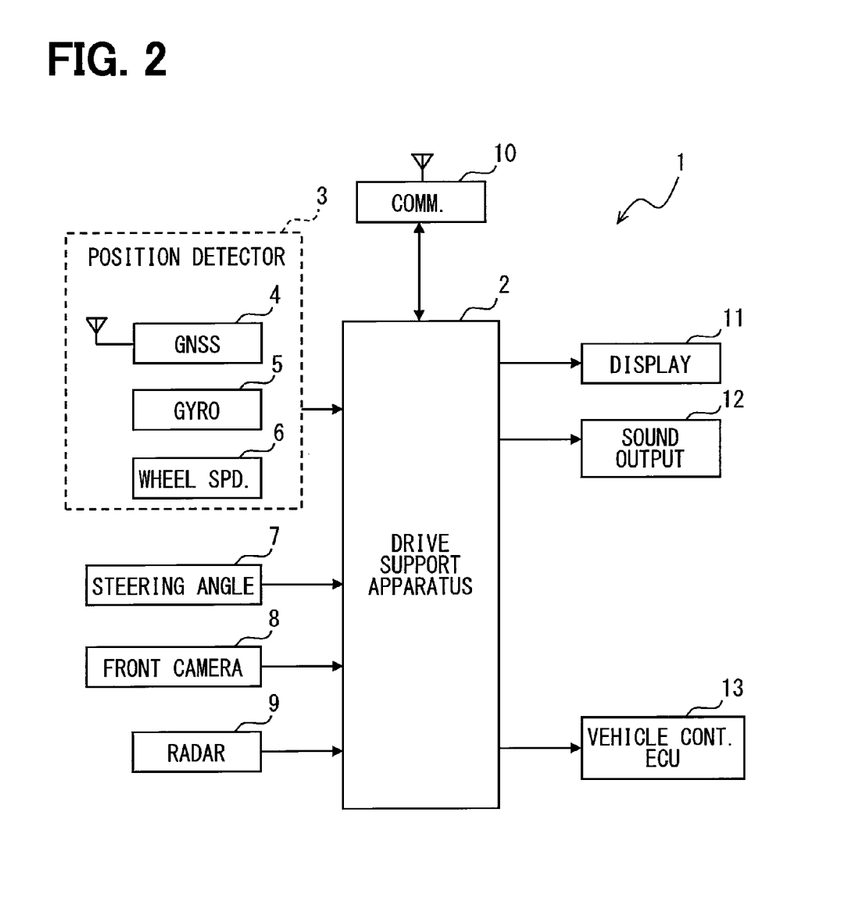
FIG. 2 is a block diagram of a drive support unit.

With reference to FIG. 2, a configuration of the drive support unit 1 disposed in each of the vehicles A to C is described. As shown in FIG. 2, the drive support unit 1 includes a drive support apparatus 2, a position detector 3, a steering angle sensor 7, a front camera 8, a radar 9, a communicator 10, a display 11, a sound output device 12, and a vehicle control Electronic Control Unit (ECU) 13.

The position detector 3 is provided with a Global Navigation Satellite System (GNSS) receiver 4, a gyro sensor 5, and a wheel speed sensor 6. The position detector 3 detects a current position (i.e., a vehicle position in the following) of an own vehicle one by one (i.e., position by position). The GNSS receiver 4 is a receiver for using a GNSS, and receives a signal transmitted from positioning satellites with a GNSS antenna. The position detector 3 measures the vehicle position based on the signal received with the GNSS receiver 4.

The gyro sensor 5 detects an angular speed generated on the own vehicle. The gyro sensor 5 may be, for example, a 3-axis gyro sensor that detects a change speed of each of a yaw angle, a roll angle, and a pitch angle. The wheel speed sensor 6 outputs a pulse signal according to the rotation speed of the wheel of the own vehicle. Based on the pulse signal outputted from the wheel speed sensor 6, a vehicle speed of the own vehicle as well as a travel distance of the own vehicle are detectable.

The position detector 3 performs a dead-reckoning of the vehicle position (i.e., estimates the vehicle position), based on the pulse signal outputted from the wheel speed sensor 6 and/or the change speed of the yaw angle (i.e., a yaw rate) detected by the gyro sensor 5, which supplements a positioning result of the GNSS receiver 4.

The steering angle sensor 7 detects a steering angle of a steering wheel or a steer-direction angle of the own vehicle. In the present embodiment, the steering angle is detected as described below.

The front camera 8 is disposed in the own vehicle, and captures an image of a front field of the own vehicle by a preset angle of imaging. The front camera 8 is installed to face a front field of the own vehicle, with its optical axis pointing to a road surface, for capturing an image that includes the road surface extending in front of the own vehicle. Further, in the present embodiment, the front camera 8 also captures an adjacent lane that is adjacent to a traveling lane of the own vehicle, which may be an opposite traffic lane, in a captured image.

The radar 9 is a laser radar and/or a millimeter wave radar, for example, and transmits a scanning wave to a preset range in front of the own vehicle, for scanning an object in the front field. The radar 9 is used for detecting an object which exists in the preset range in front of the own vehicle. Although the present embodiment shows a configuration in which the radar 9 is used as a sensor that transmits the scanning wave to the preset range in front of the own vehicle, the configuration of using such sensor may be modified. For example, in other configurations, a sensor such as a sonar or the like may be used to transmit the scanning wave to the preset range in front of the own vehicle.

The communicator 10 performs wireless communications via an antenna with the communicators 10 respectively disposed in other vehicles around the own vehicle (i.e., performs a vehicle-to-vehicle communication). The vehicle-to-vehicle communication may be performed by a wave range of 700 MHz bands, for example.

The display 11 displays a text and/or an image according to instructions of the drive support apparatus 2. The display 11 may be a display device, or an indicator.

The sound output device 12 comprises a loudspeaker etc., and outputs a sound according to instructions of the drive support apparatus 2.

The vehicle control ECU 13 is an electrical control unit which performs a speed adjustment control and a steering control of the own vehicle. The vehicle control ECU 13 may be, for example, a steering ECU which performs a steering control, as well as an engine ECU and a brake ECU which perform speed adjustment control, etc.

The drive support apparatus 2 is provided with memories (e.g., Central Processing Unit (CPU), Read-Only Memory (ROM), and (Random-Access Memory RAM), as well as an Input/Output (I/O) and a bus that connects these components to each other, and performs various processes by executing a control program stored in ROM. For example, various processes include a process that identifies a situation of the traveling road in front of the own vehicle, and a process that transmits a sensor-detected information from the own vehicle to other vehicles, an auto drive related process that performs an auto-steering control of the own vehicle, and a lead vehicle follow related process that performs an auto-steering of the own vehicle at a time of performing a lead vehicle follow control, in which the auto-steering of the own vehicle is performed to follow the lead vehicle.

The drive support apparatus 2 corresponds to a vehicle controller. The function realized by the drive support apparatus 2 may be provided by one IC (i.e., by one piece of hardware), in part or as a whole.

<Configuration of the Drive Support Apparatus 2>

Figure 3:
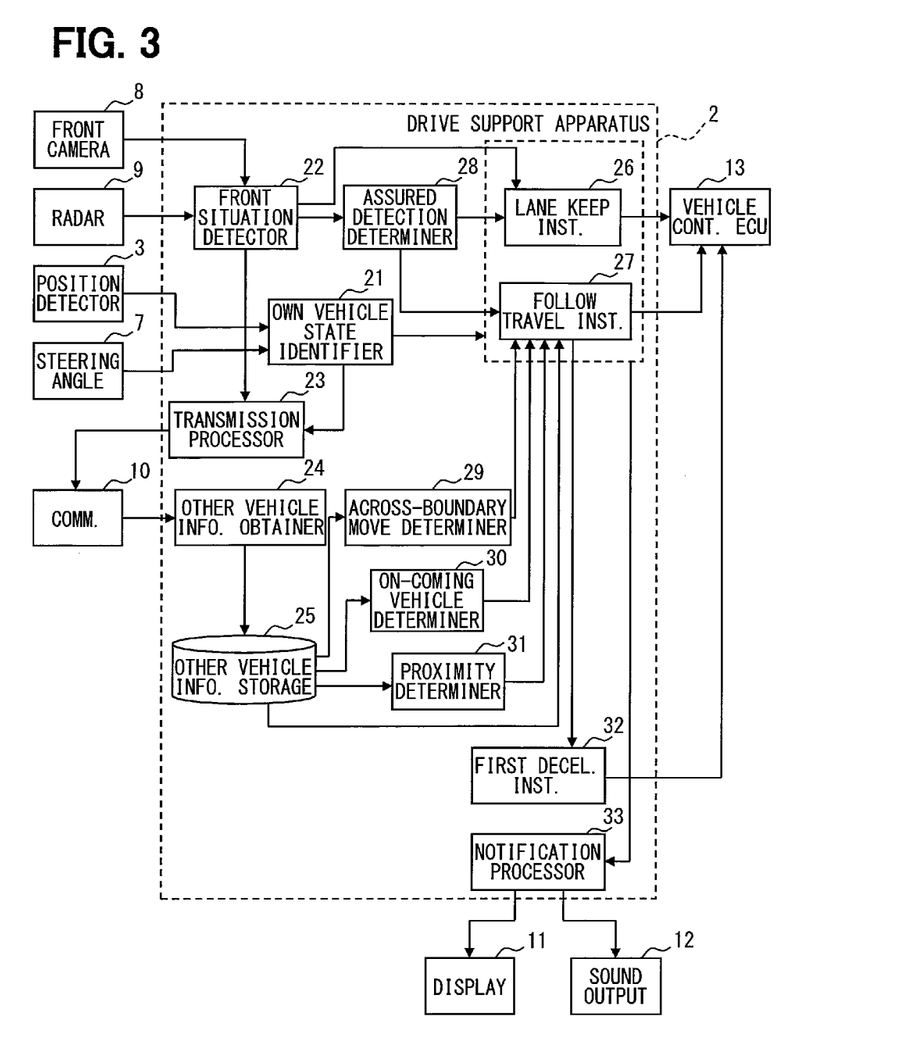
FIG. 3 is a block diagram of a drive support apparatus.

The drive support apparatus 2 includes, as shown in FIG. 3, an own vehicle state identifier 21, a front situation detector 22, a transmission processor 23, an other vehicle information obtainer 24, an other vehicle information storage 25, a lane keep instructor 26, a follow travel instructor 27, an assured detection determiner 28, an across-boundary move determiner 29, an on-coming vehicle determiner 30, a proximity determiner 31, and a first deceleration instructor 32, and a notification processor 33.

The own vehicle state identifier 21 identifies a vehicle state of the own vehicle one by one, at preset intervals. For example, the vehicle position of the own vehicle is identified from a vehicle position of the own vehicle detected by the position detector 3. Further, a travel direction of the own vehicle is identified from the detection result of the gyro sensor 5 in the position detector 3, or the vehicle speed of the own vehicle is identified from the signal of the wheel speed sensor 6 in the position detector 3. Further, the steering angle of the own vehicle is identified from a steering angle detected by the steering angle sensor 7. Further, a vehicle width of the own vehicle stored in a nonvolatile storage of the drive support apparatus 2 is read, and the vehicle width of the own vehicle is identified.

The vehicle speed of the own vehicle may be identified from an amount of change of the vehicle position detected one by one with the position detector 3. Further, the travel direction of the own vehicle may be identified based on time-series data of the vehicle positions (i.e., by drawing an approximate line of the time-series vehicle positions detected during a certain period of time by the position detector 3 by the least-square method).

The front situation detector 22 detects a situation of the traveling road in front of the own vehicle by using the front camera 8 and/or the radar 9. For example, the front situations (e.g., a road geometry in front of the own vehicle and a relationship between the road and the own vehicle) are detected by the detector 22. The front camera 8 and/or the radar 9 correspond to a sensor.

In the present embodiment, the front camera 8 is used to detect a traffic lane, and the radar 9 is used to detect an obstacle. Details of such configuration are described below.

The front situation detector 22 recognizes a traffic lane boundary by performing an image recognition process (e.g., an edge detection), on an image captured by the front camera 8, and detects a road shape in front of the own vehicle by calculating, with reference to the vehicle position of the own vehicle, a position of the traffic lane boundary, a traffic lane width, a traffic lane center line, a curvature radius of the traffic lane, an offset amount of the own vehicle relative to the traffic lane center line, and the like. The offset amount of the own vehicle relative to the traffic lane center line may also be understood as a side shift amount relative to a traveling lane, or a shift amount of a vehicle in a vehicle width direction. Further the front situation detector 22 may detect the yaw angle of the own vehicle from an angle of the own vehicle relative to the recognized traffic lane. The yaw angle may also be detected by the gyro sensor 5.

A center of the traffic lane may be identified by, for example, calculating a middle point between two adjacent traffic lane boundary lines. In the present embodiment, the curvature radius of the traffic lane is calculated as a curvature radius of the traffic lane center line.

The position of each of the traffic lane boundary lines relative to the own vehicle and the position of the traffic lane center line relative to the own vehicle may be, for example, represented by position coordinates of X/Y axes that are defined as a road-surface coordinate system having the position of the own vehicle as its origin. A traffic lane boundary line may simply be designated as a traffic lane boundary in the following.

Further, the front situation detector 22 detects an obstacle based on a reception intensity of a reflected wave which is a reflection of the scanning wave from the radar 9 reflected by a front object. The front situation detector 22 detects a direction of the obstacle relative to the own vehicle based on a transmission direction of the scanning wave from which the reflected wave is obtained, and detects a distance from the own vehicle to the obstacle based on a time from a transmission of the scanning wave to a reception of the reflected wave from the obstacle, which then enables a detection of a relative position of the obstacle relative to the own vehicle.

The front situation detector 22 detects a relative speed of the obstacle relative to the own vehicle by using a publicly-known method based on a doppler shift between the scanning wave and the reflected wave. The relative speed of the obstacle may also be detected based on a per-unit-time change of the relative position of the obstacle relative to the own vehicle.

Further, the front situation detector 22 detects a range of on-road obstacles (i.e., an on-road obstacle occupancy range), for example, a parked vehicle on a road shoulder etc., relative to the position of the own vehicle and an on-coming vehicle, based on the position of the traffic lane boundary detected by the front camera 8, and the relative position/speed of the obstacle detected by the radar 9.

When existence of the on-coming vehicle has been detected, the relative position and the relative speed of the on-coming vehicle detected by the radar 9 relative to the own vehicle are considered as the on-coming vehicle's relative position and relative speed relative to the own vehicle.

The on-road obstacle occupancy range, the existence of the on-coming vehicle, and the relative position and the relative speed of the on-coming vehicle relative to the own vehicle may also be detected by using a captured image that is captured by the front camera 8 without using the radar 9. In such case, the on-road obstacle and/or the on-coming vehicle may be detected from the relationship between (i) the obstacle and the vehicles and (ii) the traffic lane that is recognized by an image recognition process performed on the captured image. Based on the installation position and the direction of the optical axis of the camera 8 relative to the own vehicle, and the position of the obstacle/vehicle in the captured image, the relative position of the on-road obstacle occupancy range and the on-coming vehicle relative to the own vehicle may be detectable. Based on the change of the size of the obstacle and/or the vehicle in the captured image, the relative speed of the on-coming vehicle relative to the own vehicle may be detectable.

The transmission processor 23 transmits the information including the vehicle state of the own vehicle identified by the own vehicle state identifier 21, and the front situation detected by the front situation detector 22 of the own vehicle from the communicator 10 one by one (i.e., at preset intervals). The vehicle state and the front situation may be collectively designated as "transmitted information" in the following.

An example of such information may include identification information that identifies a transmitting vehicle and the vehicle state of the own vehicle, the vehicle state including the vehicle position, the vehicle speed, the travel direction, and the vehicle width of the own vehicle identified by the own vehicle state identifier 21; and front situation information of the own vehicle (i.e., a situation in front of the own vehicle) including the position of the traffic lane boundary relative to the own vehicle, the traffic lane width, the on-road obstacle occupancy range, the existence of the on-coming vehicle, the relative position/speed of the on-coming vehicle relative to the own vehicle, and the side shift amount of the own vehicle relative to the traveling lane detected by the front situation detector 22. The information regarding the existence of the on-coming vehicle corresponds to on-coming vehicle information.

Further, the speed and the travel direction of the own vehicle are identifiable based on the time-series data of the vehicle positions of the own vehicle. Therefore, when the time-series data of the vehicle positions of the own vehicle is transmitted, the transmission of the speed and the travel direction of the own vehicle may be dispensed. Further, the vehicle state and the front situation information of the own vehicle may be simultaneously transmitted at the same timing, or may be transmitted at respectively different timings.

The other vehicle information obtainer 24 obtains, one by one (i.e., at intervals), the above-mentioned transmitted information via the communicator 10 of the own vehicle from the communicator 10 of the drive support unit 1 disposed in other vehicles. The information obtained from the other vehicles corresponds to the other vehicle information.

The other vehicle information obtainer 24 stores, in the other vehicle information storage 25, the transmitted information obtained from the other vehicles in association with the transmitting vehicles. The transmitting vehicle is identified by the identification information in the transmitted information. When the transmitted information is configured not to include the identification information, the transmitting vehicle may be identified based on a correlation of the travel path of the vehicle, which is derived from the time-series data of the vehicle positions.

The traffic lane keep instructor 26 controls the vehicle control ECU 13 to perform a lane keep travel control by the auto-steering, for keeping the traveling lane of the own vehicle (i.e., a travel of the own vehicle kept within the traffic lane boundaries of the currently-traveling lane), based on the front situation of the own vehicle detected by the front situation detector 22 using the front camera 8 and the radar 9. More practically, the instructor 26 controls the own vehicle to travel along the traffic lane center line of the currently-traveling traffic lane detected by the front situation detector 22, by sending instructions to the vehicle control ECU 13 for changing/adjusting the steering angle, the brake pressure, the suction air amount, the gear ratio, and the like.

In case that the traffic lane center line cannot be accurately detectable based on the traffic lane boundary recognized by the front situation detector 22 because the traffic lane boundary in front of the own vehicle is covered by the lead vehicle, the lane keep travel control cannot be performed.

The follow travel instructor 27 controls the vehicle control ECU 13 to perform the lead vehicle follow control by the auto-steering the own vehicle to follow the lead vehicle. More practically, based on a center position of the lead vehicle in the vehicle width direction, and the amount of change of such center position that are identified by using the front camera 8 and the radar 9, the travel path of the lead vehicle is identified. The instructor 27 then controls the own vehicle to travel along such a travel path of the lead vehicle, by sending instructions to the vehicle control ECU 13, to change/adjust the steering angle, the brake pressure, the suction air amount, the gear ratio, and the like.

The travel path of the lead vehicle may be identified from the transmitted information of the lead vehicle, which is obtained by the other vehicle information obtainer 24 and has been stored in the other vehicle information storage 25.

The follow travel instructor 27 performs a process according to determination results of the across-boundary move determiner 29, the on-coming vehicle determiner 30, and the proximity determiner 31, when controlling the ECU 13 to perform the lead vehicle follow control. Details of such a process are described later.

The assured detection determiner 28 determines whether the front situation of the own vehicle is assuredly detected by the front camera 8 and/or the radar 9 for performing the lane keep travel control mentioned above. More practically, when a length of the traffic lane boundary line recognized from the image captured by the front camera 8 and detected by the front situation detector 22 is less than a threshold value, the assured detection determiner 28 determines that the front situation is not detected. When the length of the traffic lane boundary line is equal to or greater than the threshold value, the assured detection determiner 28 determines that the front situation is detected. The threshold value in the above may be defined as a value that enables an accurate calculation (i.e., detection/recognition) of the traffic lane center line, for example.

In the drive support apparatus 2, when it is determined by the assured detection determiner 28 that the front situation is detected, the traffic lane keep instructor 26 performs the lane keep travel control, and the follow travel instructor 27 does not perform the lead vehicle follow control.

On the other hand, when it is determined by the assured detection determiner 28 that the front situation is not detected (i.e., there is a lack of assured detection of the front situation), the traffic lane keep instructor 26 does not perform the lane keep travel control, and the follow travel instructor 27 instead performs the lead vehicle follow control.

The across-boundary move determiner 29 determines whether it is likely, or probable, for the lead vehicle of the own vehicle to cross the traffic lane boundary to the opposite traffic lane (i.e., whether the lead vehicle may be, or possibly run across the traffic lane boundary to the opposite traffic lane), based on the transmitted information of the lead vehicle that is obtained by the other vehicle information obtainer 24 and stored in the other vehicle information storage 25.

The possibility (i.e., probability or likelihood) for the lead vehicle of the own vehicle to cross the traffic lane boundary to the opposite traffic lane may be determined in the following manner, for example.

First, based on the transmitted information of the lead vehicle, the range of the on-road obstacle occupying in the traveling lane of the lead vehicle is determined as a range along the vehicle width direction, which is determined from the position of the traffic lane boundary relative to the lead vehicle, and the on-road obstacle occupancy range.

Then, based on the determined range and the traffic lane width in the transmitted information of the lead vehicle, a travelable range of the lead vehicle within the traveling lane of the lead vehicle is determined as a range along the vehicle width direction, which may also be designated as a travelable width.

Then, in case that a margin-subtracted travelable range, which is derived by subtracting a preset margin of 1 meter from the determined travelable range for example, is smaller than the vehicle width of the lead vehicle in the transmitted information of the lead vehicle, it is determined that the lead vehicle may possibly cross the traffic lane boundary across to the opposite traffic lane.

On the other hand, when the margin-subtracted travelable range derived by subtracting the preset margin from the determined travelable range is equal to or greater than the vehicle width of the lead vehicle, it is determined that the lead vehicle is unlikely to (i.e., improbable to) cross the traffic lane boundary across to the opposite traffic lane.

The on-coming vehicle determiner 30 determines the existence of the on-coming vehicle in the opposite traffic lane of the lead vehicle, based on the existence of the on-coming vehicle in the transmitted information of the lead vehicle, which is obtained by the other vehicle information obtainer 24, and has been stored in the other vehicle information storage 25.

The proximity determiner 31 determines whether it may be possible or probable for the own vehicle to (i.e., is likely that the own vehicle will) come close to the on-coming vehicle based on (A) (i) the relative position and the relative speed of the on-coming vehicle relative to the lead vehicle and (ii) the vehicle position and the vehicle speed of the lead vehicle in the transmitted information of the lead vehicle that is obtained by the other vehicle information obtainer 24, and stored in the other vehicle information storage 25; and (B) the position and the speed of the own vehicle. In such case, the relative position and the relative speed of the on-coming vehicle relative to the lead vehicle correspond to proximity information regarding (i) a position of the on-coming vehicle and (ii) a change of the position of the on-coming vehicle.

More practically, as an example, a distance between the own vehicle and the on-coming vehicle is calculated from the relative position of the on-coming vehicle relative to the lead vehicle, the vehicle position of the lead vehicle, and the vehicle position of the own vehicle. Further, based on the relative speed of the on-coming vehicle relative to the own vehicle, the vehicle speed of the lead vehicle, and the vehicle speed of the own vehicle, the relative speed of the on-coming vehicle relative to the own vehicle is calculated.

Then, by dividing the distance between the own vehicle and the on-coming vehicle by the relative speed of the on-coming vehicle relative to the own vehicle, a time to proximity of the on-coming vehicle (i.e., when the on-coming vehicle comes closest to the own vehicle, is calculated.

Then, based on such time to proximity of the on-coming vehicle (e.g., when such time to proximity is either long enough or short enough to make it unlikely for the on-coming vehicle to come close to the own vehicle, it is determined that it is not possible (i.e., unlikely or improbable) for the own vehicle to come close to the on-coming vehicle. On the other hand, when such time to proximity has a length of making it possible (i.e., likely or probable) for the on-coming vehicle to come close to the own vehicle, it is determined that it is likely (i.e., probable or may be possible) for the own vehicle to come close to the on-coming vehicle.

Further, it may also be feasible to determine the possibility (i.e., likelihood or probability) for the own vehicle and the on-coming vehicle to come close to each other (i) by estimating a rough timing of cross-boundary move of the own vehicle due to a follow control to follow the lead vehicle based on the vehicle speed of the own vehicle and a distance from the vehicle position of the own vehicle to the on-road obstacle occupancy range, and (ii) by determining a degree of closeness between the vehicle position of the own vehicle and the vehicle position of the on-coming vehicle at such timing.

When the follow travel instructor 27 stops the lead vehicle follow control, the first deceleration instructor 32 sends instructions to the vehicle control ECU 13, and slows down (i.e., decelerates) the own vehicle.

The notification processor 33 controls the display 11 and/or the sound output device 12, based on the information obtained by the other vehicle information obtainer 24, to notify the information of the front situation of the lead vehicle and the information indicating a possibility (i.e., probability or likelihood) of the lead vehicle to cross the traffic lane boundary to the opposite traffic lane.

Notification timing to notify such information may be, for example, a timing of when to perform the lead vehicle follow control, or may be a timing of when to perform an auto drive (e.g., the lead vehicle follow control and/or the lane keep travel control).

Such notification may be performed by displaying an icon regarding an existence of a parked vehicle, an existence of an on-coming vehicle, and a possibility of cross-boundary move of the lead vehicle, or by displaying an image of a positional relationship between (i) the own vehicle and (ii) the lead vehicle, the parked vehicle, and/or the on-coming vehicle. Further, notification contents may be voiced.

<Auto Drive Related Process>

Figure 4:
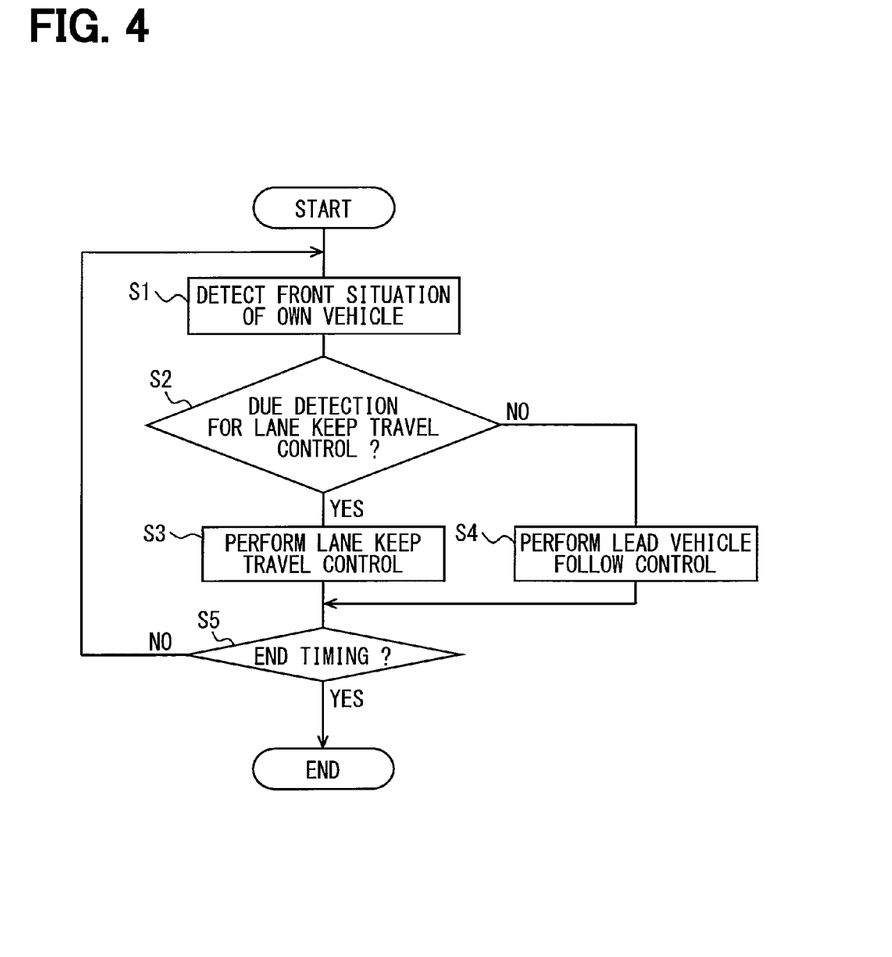
FIG. 4 is a flowchart of an automatic drive related process performed by the drive support apparatus.

Here, an auto drive related process is described with reference to a flowchart of FIG. 4, which is an example of controlling the own vehicle by an auto-steering of the drive support apparatus 2.

The auto drive related process may be started when, for example, an ignition switch of the own vehicle is set to ON. In case that an operation input section is provided in the drive support unit 1 for switching between an auto drive and a manual drive, the auto drive related process may be started when the auto drive is selected by such operation input section and the ignition switch of the own vehicle is set to ON.

First, in Step S1, the front situation detector 22 detects the front situation of the own vehicle.

In Step S2, the assured detection determiner 28 determines whether the front situation of the own vehicle is detected in S1 for performing the lane keep travel control. In other words, for example, it is determined in Step S2 whether the front situation is sufficiently or unambiguously detected for performing the lane keep travel control of the own vehicle (i.e., "DUE DETECTION" in S2 of FIG. 4).

When it is determined that the front situation is detected (YES in S2), the process proceeds to Step S3. On the other hand, when it is determined that the front situation is not detected (NO in S2), the process proceeds to Step S4.

In Step S3, the traffic lane keep instructor 26 controls the vehicle control ECU 13 to perform the lane keep travel control by an auto-steering, for keeping the travel of the own vehicle to be within the traveling lane based on the front situation of the own vehicle detected by the front situation detector 22, and the process proceeds to Step S5.

In Step S4, the follow travel instructor 27 controls the vehicle control ECU 13 to perform the lead vehicle follow control by an auto-steering for controlling the own vehicle to follow the lead vehicle, and the process proceeds to Step S5.

In Step S5, it is determined whether an end timing for ending the auto drive related process has arrived. When it is determined as an end timing of the auto drive related process (YES in S5), the auto drive related process is ended.

On the other hand, when it is determined as not an end timing of the auto drive related process (NO in S5), the process returns to S1, and the same process is repeated.

An example of the end timing of the auto drive related process may be a switch timing of the ignition switch of the own vehicle to be switched to OFF, a switch timing of the operation input section to switch the auto drive to the manual drive.

In the auto drive related process, even when tentatively performing the lead vehicle follow control as a result of non-enablement of the lane keep travel control, once the assured detection determiner 28 starts to detect the front situation for the lane keep travel control again, the lane keep travel control is resumed.

<Lead Vehicle Follow Related Process>

Figure 5:
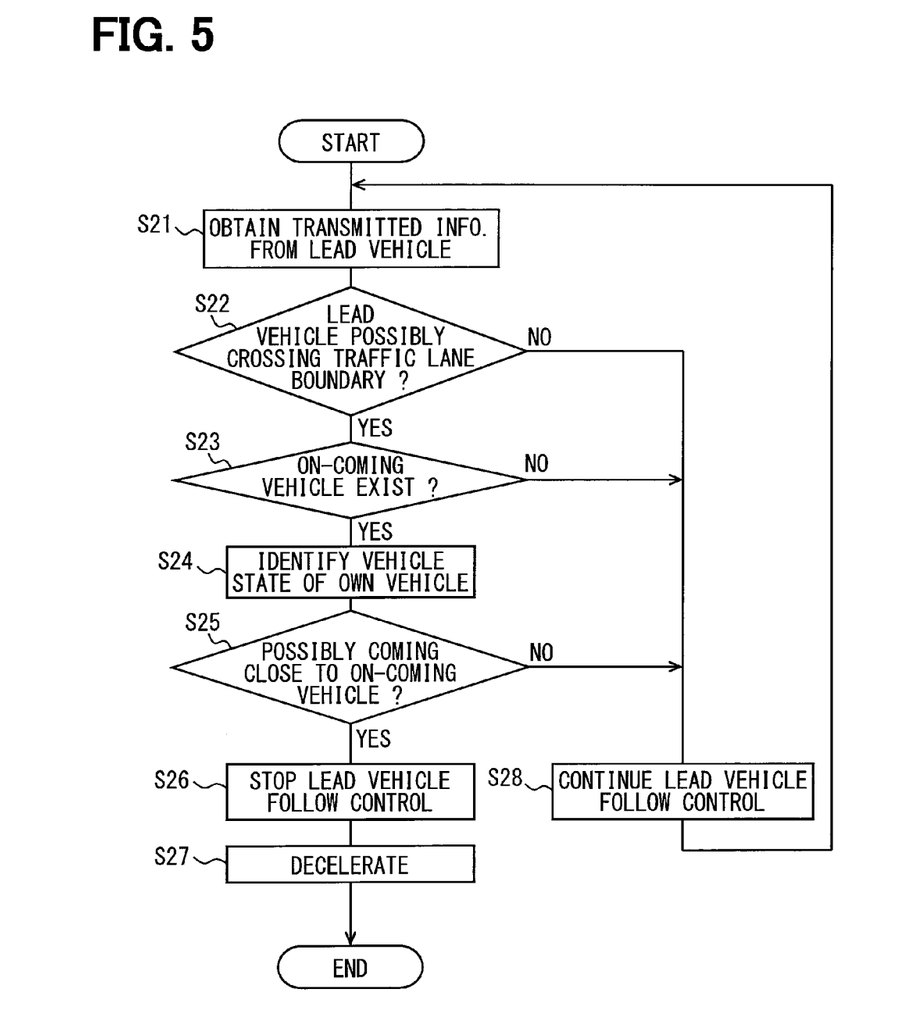
FIG. 5 is a flowchart of a lead vehicle follow related process by the drive support apparatus.

With reference to a flowchart of FIG. 5, an example of the lead vehicle follow related process performed at the time of performing the lead vehicle follow control in the drive support apparatus 2 is described. The lead vehicle follow related process may be started when the lead vehicle follow control is started.

First, in Step S21, the other vehicle information obtainer 24 obtains, by using the communicator 10 of the own vehicle, the transmitted information transmitted from the communicator 10 of the drive support unit 1 disposed in the lead vehicle, and stores the information in the other vehicle information storage 25.

In Step S22, the across-boundary move determiner 29 determines whether it may be possible (i.e., likely or probable) for the lead vehicle of the own vehicle to cross the traffic lane boundary across to the opposite traffic lane, based on the transmitted information of the lead vehicle.

When it is determined that the lead vehicle of the own vehicle may possibly (i.e., is likely or probable to) cross the traffic lane boundary (YES in S22), the process proceeds to Step S23. On the other hand, when it is determined that the lead vehicle of the own vehicle does not possibly (i.e., is unlikely or improbable to) cross the traffic lane boundary (NO in S22), the process proceeds to Step S28.

In Step S23, the on-coming vehicle determiner 30 determines whether an on-coming vehicle exists in the opposite traffic lane of the lead vehicle based on the transmitted information of the lead vehicle.

When it is determined that the on-coming vehicle exists (YES in S23), the process proceeds to Step S25. On the other hand, when it is determined that no on-coming vehicle exists (NO in S23), the process proceeds to Step S28.

In Step S24, the own vehicle state identifier 21 identifies the vehicle state of the own vehicle.

In Step S25, the proximity determiner 31 determines whether it is possible (i.e., likely or probable) for the own vehicle and the on-coming vehicle to come close to each other, based on the transmitted information of the lead vehicle and the vehicle state of the own vehicle.

When it is determined that it is possible (i.e., likely or probable) that the own vehicle and the on-coming vehicle may come close to each other (YES in S25), the process proceeds to Step S26. On the other hand, when it is determined that it is unlikely or improbable that the own vehicle and the on-coming vehicle come close to each other (NO in S25), the process proceeds to Step S28.

In Step S26, the follow travel instructor 27 stops the lead vehicle follow control, and the process proceeds to Step S27.

In Step S27, the first deceleration instructor 32 sends instructions to the vehicle control ECU 13, slows down the own vehicle, and ends the lead vehicle follow related process.

On the other hand, in Step S28, the follow travel instructor 27 continues the lead vehicle follow control, returns the process to S21, and repeats the same process.

<Summary of the First Embodiment>

In case that the lead vehicle follow control by an auto-steering is performed for controlling the own vehicle to follow the lead vehicle, when (i) the lead vehicle crosses (from a currently-traveling subject traffic lane) the traffic lane boundary across to the opposite traffic lane, (ii) the on-coming vehicle exists in the opposite traffic lane, and (iii) it is possible (i.e., likely or probable) for the own vehicle and the on-coming vehicle to come close to each other, the own vehicle may also cross the traffic lane boundary to the opposite traffic lane, and may come close to the on-coming vehicle. In such case, when the own vehicle and the on-coming vehicle come close to each other, making the occupant of the own vehicle frightened.

On the other hand, according to the configuration of the first embodiment, when it is determined that (i) the lead vehicle crosses the traffic lane boundary to the opposite traffic lane, (ii) the on-coming vehicle exists in the opposite traffic lane, and (iii) it is possible (i.e., likely or probable) for the own vehicle and the on-coming vehicle to come close to each other, the lead vehicle follow control is stopped, thereby preventing the own vehicle to cross the traffic lane boundary by following the lead vehicle. As a result, a proximity situation in which the own vehicle and the on-coming vehicle come close to each other is prevented, thereby not making the occupant of the own vehicle frightened due to the closeness of the own vehicle and the on-coming vehicle.

Further, when it is determined that the lead vehicle does not cross the traffic lane boundary, when it is determined that no on-coming vehicle exists in the opposite traffic lane, or when it is determined that the own vehicle and the on-coming vehicle do not come close to each other, even when the own vehicle follows the lead vehicle, a possibility (i.e., likelihood or probability) that the own vehicle and the on-coming vehicle come close to each other is low.

According to the configuration of the first embodiment, the lead vehicle follow control is continued in a non-proximate (i.e., far distance) situation in which the occupant does not become unsettled of being in the own vehicle, due to the far distance between the own vehicle and the on-coming vehicle. Therefore, according to the configuration of the first embodiment, the lead vehicle follow control is stoppable as required in an accurate manner.

Also, according to the configuration of the first embodiment, the own vehicle is decelerated when stopping the lead vehicle follow control, thereby increasing an inter-vehicle distance between the own vehicle and the lead vehicle. Therefore, a front road covered situation in which the traffic lane boundary of the traveling road in front of the own vehicle is covered by the lead vehicle is resolved, and the lane keep travel control is resumable. As a result, in a situation in which it is not preferable to continue the lead vehicle follow control, the lead vehicle follow control is switchable to the lane keep travel control.

Further, according to the configuration of the first embodiment, the information about the front situation and/or the information about a possibility of the lead vehicle to cross the traffic lane boundary to the opposite traffic lane are notified, even in a front unobtainable situation (i.e., when the front situation of the own vehicle is difficult to ascertain or obtain by the occupant of the own vehicle due to the existence of the lead vehicle), the front situation becomes discernible by the occupant of the own vehicle based on the information notification. As a result (i.e., by the resolution of the front unobtainable situation), the occupant of the own vehicle feels safe.

(Modification 1)

The reliability of the transmitted information transmitted from the lead vehicle is identified by the drive support apparatus 2 of the own vehicle, and when the identified reliability is lower than the threshold value, the own vehicle may be controlled to decelerate.

In the following, a control scheme of the modification 1 is described with reference to the drawing. In the modification 1 and in other embodiments/modifications, like numbers represent like parts. The drive support unit 1 of the modification 1 is the same as the drive support unit 1 of the first embodiment, except that the drive support unit 1 includes a drive support apparatus 2a instead of the drive support apparatus 2.

Figure 6:
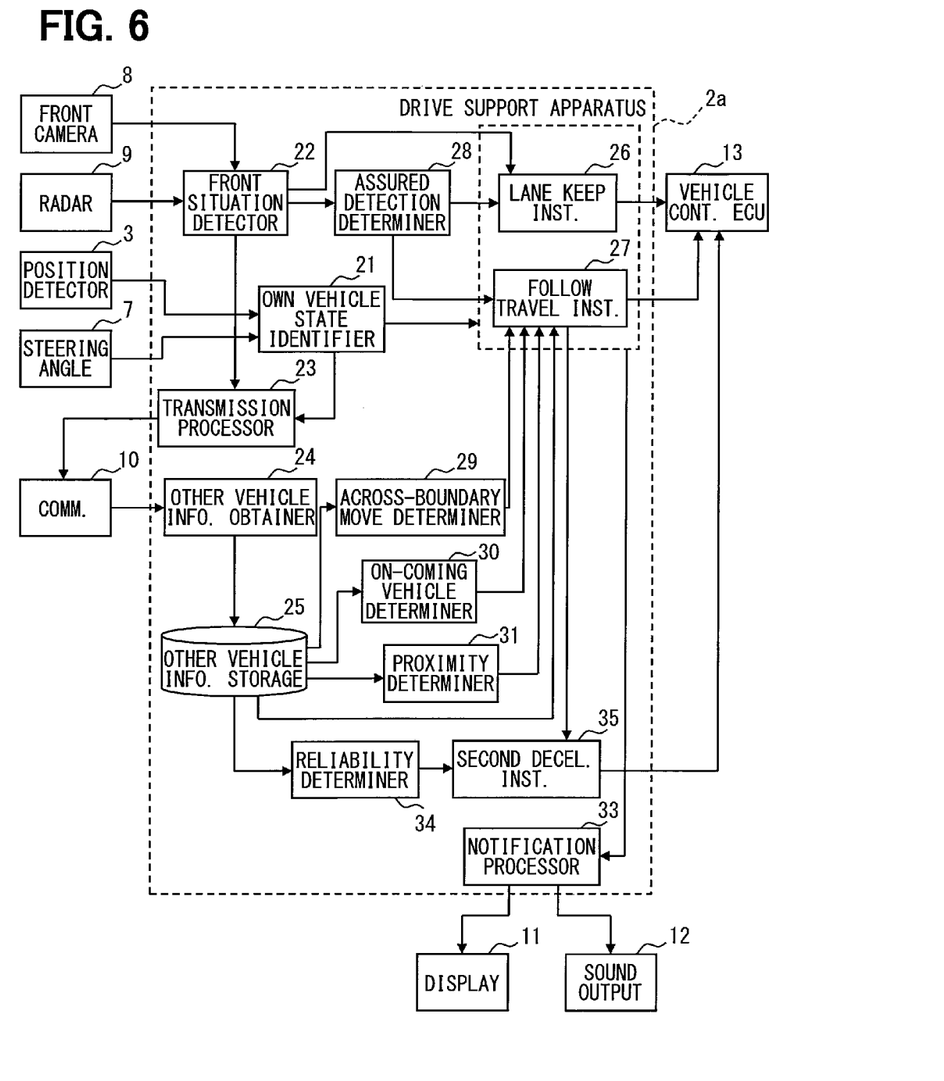
FIG. 6 is a block diagram of the drive support apparatus.

The drive support apparatus 2a includes, as shown in FIG. 6, the own vehicle state identifier 21, the front situation detector 22, the transmission processor 23, the other vehicle information obtainer 24, the other vehicle information storage 25, the traffic lane keep instructor 26, the follow travel instructor 27, and the assured detection determiner 28, the across-boundary move determiner 29, the on-coming vehicle determiner 30, the proximity determiner 31, and the notification processor 33, a reliability determiner 34 and a second deceleration instructor 35.

The drive support apparatus 2a is the same as the drive support apparatus 2 of the first embodiment, except that it has the reliability determiner 34 and the second deceleration instructor 35, the latter of which replaces the first deceleration instructor 32.

The drive support apparatus 2a corresponds to the vehicle control device.

The reliability determiner 34 determines, or identifies, a reliability of the transmitted information of the lead vehicle based on the front situation information of the transmitted information of the lead vehicle stored in the other vehicle information storage 25.

An example of such reliability identification may be that, based on the front situation information of the lead vehicle transmitted from the lead vehicle, a change in the front situation information is calculated, and the reliability is identified as low when the amount of change is large.

More practically, based on the non-changing or scarcely-changing quantity such as a position of the traffic lane boundary relative to the lead vehicle or a traffic lane width, the reliability is identified.

The second deceleration instructor 35 is the same as the first deceleration instructor 32 of the first embodiment, except that the instructor 35 performs a process according to the reliability identified by the reliability determiner 34.

When the reliability identified by the reliability determiner 34 is lower than the threshold value, the second deceleration instructor 35 sends instructions to the vehicle control ECU 13, and slows down the own vehicle. The threshold value described above is a value that may be an unsafe travel value, which does not guarantee a safe travel of the own vehicle. Such a threshold value may be arbitrarily determined.

In case that the lane keep travel control is performed based on the front situation of the lead vehicle which is based on the detection by using the front camera 8 and the radar 9, when the accuracy (i.e., the reliability) of the front situation information of the lead vehicle lowers, the lead vehicle may meander/steer steeply or the like (i.e., the travel of the lead vehicle may become unstable).

On the other hand, according to the configuration of the modification 1, when the reliability of the front situation information of the lead vehicle is lower than the threshold value, after deceleration of the own vehicle and by increasing the inter-vehicle distance to the lead vehicle, the lead vehicle follow control is stopped, and the drive support apparatus 2a safely switches to the lane keep travel control.

As a result, even when the travel of the lead vehicle is unstable, by not performing the lead vehicle follow control, the own vehicle is prevented from performing the unstable or unsafe follow travel control.

Further, when the reliability identified by the reliability determiner 34 is lower than the threshold value, the second deceleration instructor 35 may decelerate the own vehicle after stopping the lead vehicle follow control by the follow travel instructor 27, or may decelerate the own vehicle before the stopping of the lead vehicle follow control.

(Modification 2)

The transmitted information transmitted from the drive support apparatus 2 may include the reliability of the front situation information of the lead vehicle, as shown in the present modification. In such case, the reliability included in the transmitted information of the lead vehicle may be utilized for identification of the reliability by the reliability determiner 34. The reliability identification by the drive support apparatus 2 of the lead vehicle may be performed in the same manner as the modification 1, which is, as described above, performed based on the amount of change in the front situation information detected by the lead vehicle.

(Modification 3)

Further, when decelerating the own vehicle under control of the first deceleration instructor 32 or the second deceleration instructor 35 for increasing the inter-vehicle distance to the lead vehicle, the inter-vehicle distance may be increased to a greater value as the vehicle width of the lead vehicle increases, which is shown in the present modification.

Figure 7A:
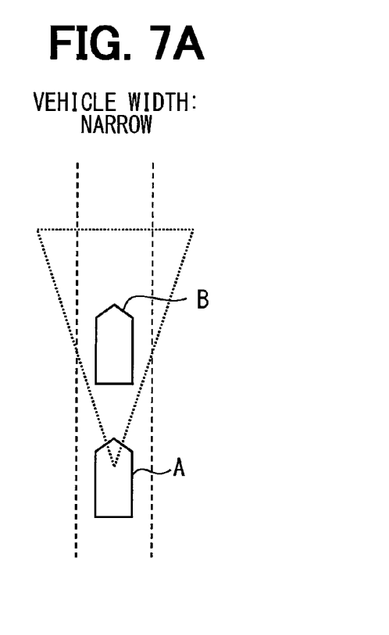
FIGS. 7A/B are illustrations of a configuration of inter-vehicle distance control scheme according to a vehicle width of a lead vehicle.
Figure 7B:
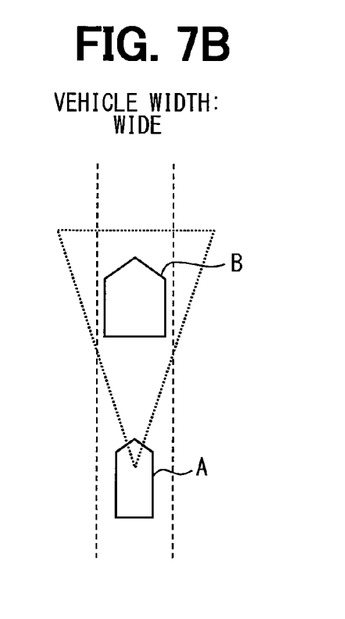

This is because the front situation of the own vehicle may be undetectable by the front camera 8 or the radar 9 unless the inter-vehicle distance to the lead vehicle is increased when the vehicle width of the lead vehicle is wider (see FIGS. 7A, 7B). In FIGS. 7A/B, the broken line represents the traffic lane boundary, and the dotted line represents the detection range of the front camera 8 or the radar 9.

Regarding the vehicle width of the lead vehicle, information of the lead vehicle that is obtained by the other vehicle information obtainer 24 and has been stored in the other vehicle information storage 25 may be utilized.

Regarding a method of increasing the inter-vehicle distance according to the vehicle width of the lead vehicle, by presetting a greater inter-vehicle distance for a wider vehicle, and by detecting the actual inter-vehicle distance by the radar 9, the first deceleration instructor 32 or the second deceleration instructor 35 may be used to decelerate the own vehicle to achieve the preset inter-vehicle distance.

Further, a degree of deceleration performed by the first deceleration instructor 32 or the second deceleration instructor 35 may be increased as the vehicle width of the lead vehicle increases. Further, a speed difference between the lead vehicle and the own vehicle may be increased as the vehicle width of the lead vehicle increases. Regarding the vehicle speed of the lead vehicle, information of the lead vehicle obtained by the other vehicle information obtainer 24 may be utilized.

According to the configuration of the modification 3, an increase of the inter-vehicle distance to the lead vehicle is enabled, thereby enabling the detection of the front situation of the own vehicle (i.e., preventing the lead vehicle from hindering the detection of the front situation of the own vehicle) for performing the lane keep travel control.

(Modification 4)

Further, when decelerating the own vehicle under control of the first deceleration instructor 32 or the second deceleration instructor 35 for increasing the inter-vehicle distance, the inter-vehicle distance may be configured as a greater value as the side shift amount of the lead vehicle relative to the traffic lane boundary increases, as shown in the present modification.

Figure 8A:
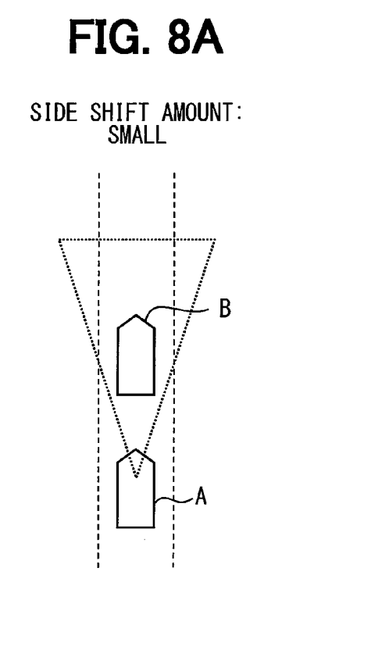
FIGS. 8A/B are illustrations of a configuration of inter-vehicle distance control according to a side shift amount of the lead vehicle relative to a traffic lane.
Figure 8B:
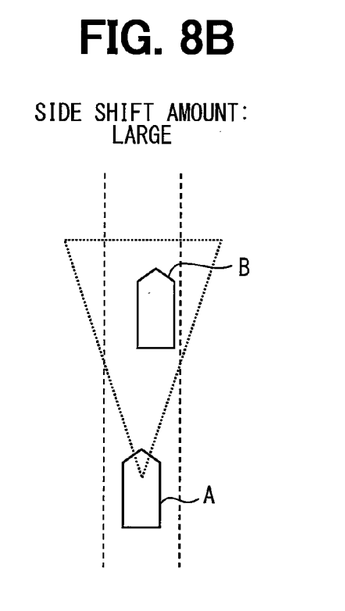

This is because the front situation of the own vehicle may be undetectable by the front camera 8 or the radar 9, unless the inter-vehicle distance to the lead vehicle is increased when the side shift amount of the lead vehicle is greater (see FIGS. 8A, 8B). In FIGS. 8A/B, the broken line represents the traffic lane boundary, and the dotted line represents the detection range of the front camera 8 or the radar 9.

Regarding the side shift amount of the lead vehicle, information of the lead vehicle which is obtained by the other vehicle information obtainer 24 and has been stored in the other vehicle information storage 25 may be utilized.

Regarding a method of increasing the inter-vehicle distance according to the side shift amount of the lead vehicle, the same method as the one in the modification 3 is substantially usable.

According to the configuration of the modification 4, an increase of the inter-vehicle distance to the lead vehicle is enabled, thereby enabling the detection of the front situation of the own vehicle (i.e., preventing the lead vehicle from hindering the detection of the front situation of the own vehicle), for performing the lane keep travel control.

(Modification 5)

In the first embodiment, a possibility of the own vehicle and the on-coming vehicle to come close to each other is determined by the proximity determiner 31, based on the relative position and the relative speed of the on-coming vehicle relative to the lead vehicle in the transmitted information transmitted from the lead vehicle. However, such a configuration may be modified.

For example, based on the vehicle position, the travel direction and the vehicle speed of the on-coming vehicle which are all transmitted from the on-coming vehicle, the proximity determiner 31 may determine a possibility of close-encounter between the own vehicle and the on-coming vehicle, as shown in the present modification.

For example, in the present modification, the distance between the own vehicle and the on-coming vehicle is calculated from the vehicle position of the on-coming vehicle and the vehicle position of the own vehicle.

Further, based on the travel direction and the vehicle speed of the on-coming vehicle and the vehicle speed of the own vehicle, the relative speed of the on-coming vehicle relative to the own vehicle may be calculated.

Then, by dividing the distance between the own vehicle and the on-coming vehicle by the relative speed of the on-coming vehicle relative to the own vehicle, a time to proximity (i.e., a time to close-encounter of the own vehicle with the on-coming vehicle) may be calculated.

Then, based on such time to proximity of the on-coming vehicle (e.g., when such time to proximity is either long enough or short enough to make it unlikely (i.e., improbable) for the on-coming vehicle to come close to the own vehicle, it is determined that it is not possible (i.e., unlikely or improbable) for the own vehicle to come close to the on-coming vehicle. On the other hand, when such time to proximity has a length of making it possible (i.e., likely or probable) for the on-coming vehicle to come close to the own vehicle, it is determined that it is possible (i.e., likely or probable) for the own vehicle to come close to the on-coming vehicle.

According to the configuration of the present modification, the information about the change of the positions of the on-coming vehicle, and the information about the position of the on-coming vehicle are obtainable directly from the on-coming vehicle, thereby enabling a more accurate determination of the possibility of the close-encounter of the own vehicle and the on-coming vehicle.

(Modification 6)

Further, without determining whether the on-coming vehicle exists or whether the own vehicle and the on-coming vehicle come close to each other, the lead vehicle follow control may be stopped according to a determination of whether the lead vehicle has run across the traffic lane boundary to the opposite traffic lane, as shown in the present modification.

In the following, such a configuration is described with reference to the drawing. The drive support unit 1 of the present modification is the same as the drive support unit 1 of the first embodiment, except that the drive support unit 1 includes the drive support apparatus 2b instead of the drive support apparatus 2.

Figure 9:
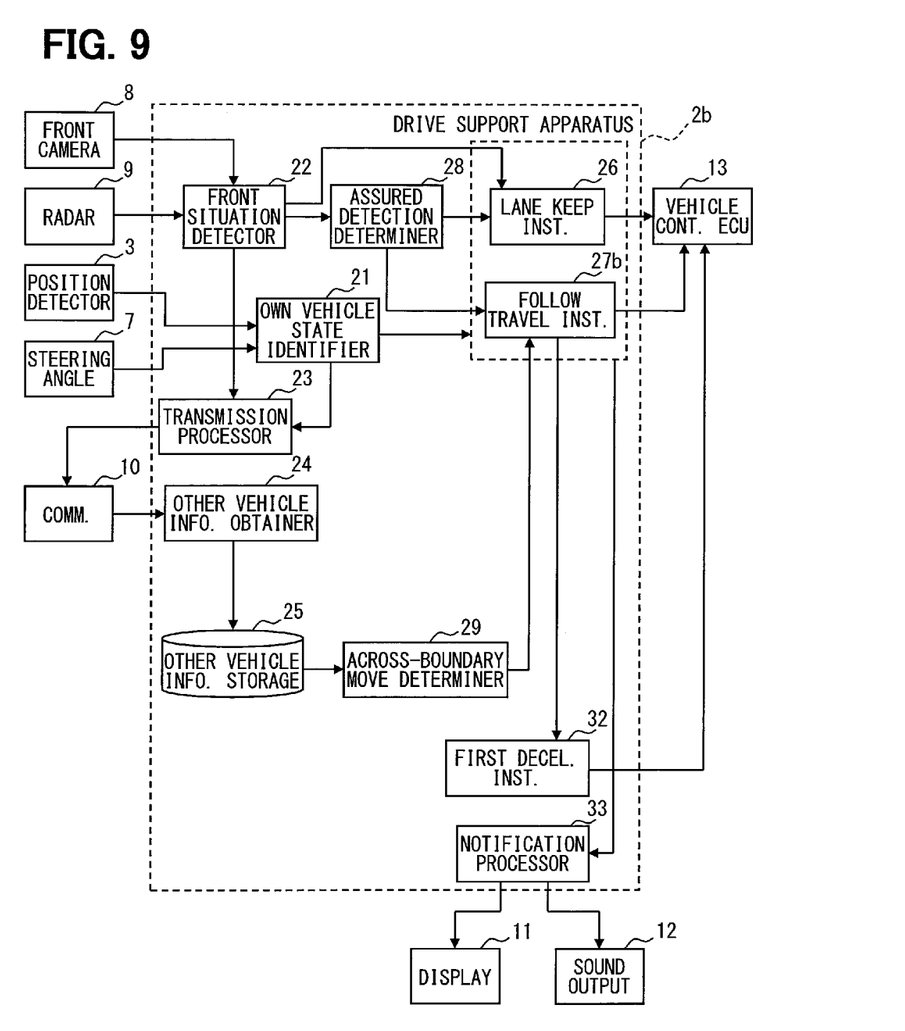
FIG. 9 is a block diagram of the drive support apparatus.

The drive support apparatus 2b includes, as shown in AG. 9, the own vehicle state identifier 21, the front situation detector 22, the transmission processor 23, the other vehicle information obtainer 24, the other vehicle information storage 25, the traffic lane keep instructor 26, the follow travel instructor 27, and the assured detection determiner 28, the across-boundary move determiner 29, the first deceleration instructor 32, the notification processor 33.

The drive support apparatus 2b is the same as the drive support apparatus 2 of the first embodiment, except for not having the on-coming vehicle determiner 30 and the proximity determiner 31; and having a follow travel instructor 27b instead of the follow travel instructor 27.

The drive support apparatus 2b corresponds to the vehicle control device.

The follow travel instructor 27b is the same as that of the follow travel instructor 27 of the first embodiment, except that the instructor 27b stops the lead vehicle follow control (i) according to a determination whether the lead vehicle has run across the traffic lane boundary to the opposite traffic lane, and (ii) without regard to whether the on-coming vehicle exists or whether the own vehicle and the on-coming vehicle come close to each other.

Figure 10:
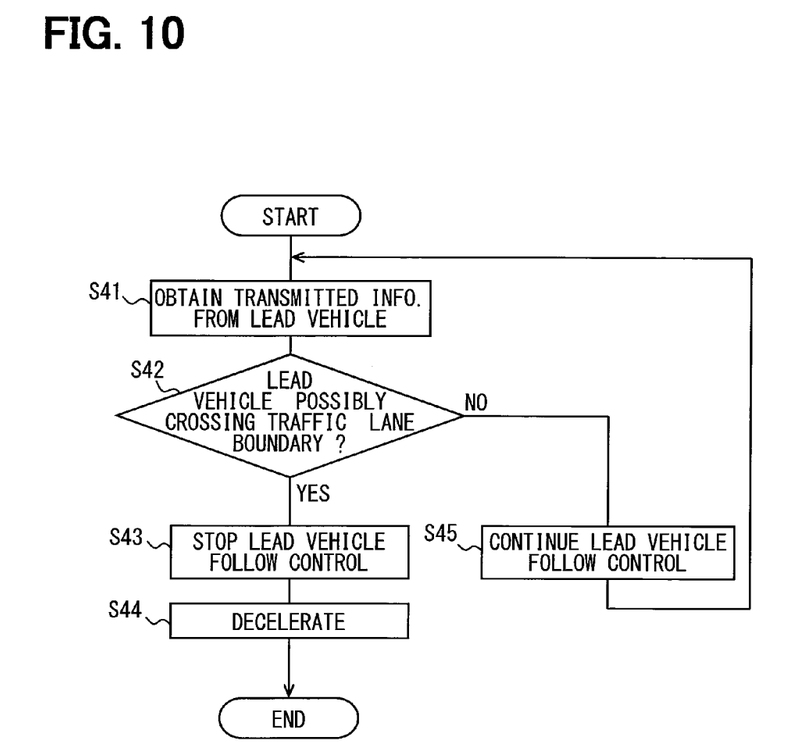
FIG. 10 is a flowchart of the lead vehicle follow related process performed by the drive support apparatus.

Here, an example of the lead vehicle follow related process performed at the time of conducting the lead vehicle follow control in the drive support apparatus 2b is described with reference to a flowchart of FIG. 10.

The lead vehicle follow related process may be configured to be started when the lead vehicle follow control is started.

First, in Step S41, just like S21, the other vehicle information obtainer 24 obtains the transmitted information from the lead vehicle, and stores the obtained information in the other vehicle information storage 25.

In Step S42, the across-boundary move determiner 29 determines a possibility (i.e., probability or likelihood) of the lead vehicle of the own vehicle to run across the traffic lane boundary to the opposite traffic lane, based on the transmitted information of the lead vehicle.

When it is determined that the lead vehicle of the own vehicle may possibly (i.e., likely or probably) run across the traffic lane boundary (YES in S42), the process proceeds to Step S43. On the other hand, when it is determined that the lead vehicle of the own vehicle is unlikely or is improbable to run across the traffic lane boundary (NO in S42), the process proceeds to Step S45.

In Step S43, the follow travel instructor 27 stops the lead vehicle follow control, and the process proceeds to Step S44.

Then, in Step S44, the first deceleration instructor 32 sends instructions to the vehicle control ECU 13, slows down the own vehicle, and ends the lead vehicle follow related process.

On the other hand, in Step S45, the follow travel instructor 27 continues the lead vehicle follow control, returns the process to S41, and repeats the same process.

According to the configuration of the present modification, when the across-boundary move determiner 29 determines that the lead vehicle may possibly (i.e., likely or probably) run across the traffic lane boundary, the lead vehicle follow control is stopped. Therefore, even in case that the lead vehicle runs across the traffic lane boundary, the own vehicle is prevented from running across the traffic lane boundary.

Therefore, (i) running across the traffic lane boundary by following the lead vehicle and (ii) moving into the opposite traffic lane at the unexpected timing of the occupant of the own vehicle are prevented, thereby preventing the occupant of the own vehicle from becoming frightened. Further, the above-described configuration of the present modification also prevents the own vehicle from coming close to the on-coming vehicle, thereby further diminishing the uneasiness of the occupant of the own vehicle.

Further, the modification 6 may be combined with the modification 2.

(Modification 7)

Further, without determining whether the own vehicle comes close to the on-coming vehicle, the lead vehicle follow control may be stopped when (i) the across-boundary move determiner 29 determines that the lead vehicle runs across the traffic lane boundary to the opposite traffic lane and (ii) the on-coming vehicle determiner 30 determines that the on-coming vehicle exists in the opposite traffic lane.

(Modification 8)

Further, when the follow travel instructors 27 and 27b stop the lead vehicle follow control, the first deceleration instructor 32 or the second deceleration instructor 35 may be configured not to decelerate the own vehicle, as shown in the present modification.

Even in the configuration of the present modification, by preventing the cross-boundary move of the own vehicle to the opposite traffic lane by stopping the lead vehicle follow control, the cross-boundary move, and the close-encounter of the own vehicle at the unexpected timing of the own vehicle occupant are prevented, thereby hardly making the occupant frightened.

(Modification 9)

Further, the across-boundary move determiner 29 may determine a possibility (i.e., probability or likelihood) of the lead vehicle to run across the traffic lane boundary to the opposite traffic lane, without using the front situation of the lead vehicle detected by the front camera 8 and/or the radar 9 of the lead vehicle.

More practically, the transmitted information from the lead vehicle may be configured to include a blinker/winker switch signal of the lead vehicle. In such manner, the across-boundary move determiner 29 can determine a possibility of the lead vehicle to run across the traffic lane boundary to the opposite traffic lane, based on the blinker/winker switch signal of the lead vehicle.

(Modification 10)

In the above-mentioned drive support system 100, the lead vehicle of the own vehicle is described as also having the drive support unit 1, such a configuration may be changed/modified. As long as the front situation of the lead vehicle is detectable, a device in the lead vehicle may be any device other than the drive support unit 1.

Although the present disclosure has been described in connection with preferred embodiment thereof with reference to the accompanying drawings, it is to be noted that various changes and modifications will become apparent to those skilled in the art, and such changes, modifications, and summarized schemes are to be understood as being within the scope of the present disclosure as defined by appended claims.

What is claimed is:

1. A vehicle controller disposed in an own vehicle, comprising:
   a follow travel instructor conducting a lead vehicle follow control by auto-steering the own vehicle to follow a lead vehicle;
   an other vehicle information obtainer obtaining transmitted information that includes front situation information that allows for a determination of whether it is likely for the lead vehicle to cross a traffic lane boundary to an opposite traffic lane, the transmitted information being transmittable from the lead vehicle via a vehicle-to-vehicle communication; and
   an across-boundary move determiner determining whether it is likely for the lead vehicle to cross the traffic lane boundary to the opposite traffic lane, based on the front situation information of the lead vehicle obtained by the other vehicle information obtainer, wherein
   the follow travel instructor stops conducting the lead vehicle follow control based on a determination by the across-boundary move determiner that it is likely for the lead vehicle to cross the traffic lane boundary.

2. The vehicle controller of claim 1, wherein
   the follow travel instructor continues the lead vehicle follow control when the across-boundary move determiner determines that it is unlikely for the lead vehicle to cross the traffic lane boundary.

3. The vehicle controller of claim 1 further comprising:
   an on-coming vehicle determiner determining whether there is an on-coming vehicle in the opposite traffic lane, wherein
   the transmitted information transmitted from the lead vehicle and obtained by the other vehicle information obtainer includes on-coming vehicle information that allows for a determination of whether the on-coming vehicle exists in the opposite traffic lane by the on-coming vehicle determiner,
   [A] the follow travel instructor stops conducting the lead vehicle follow control when (i) the across-boundary move determiner determines that it is likely for the lead vehicle to cross the traffic lane boundary and (ii) the on-coming vehicle determiner determines that the on-coming vehicle exists, and
   [B] the follow travel instructor continues the lead vehicle follow control when the on-coming vehicle determiner determines that no on-coming vehicle exists, even when the across-boundary move determiner determines that it is likely for the lead vehicle to cross the traffic lane boundary.

4. The vehicle controller of claim 3 further comprising:
   a proximity determiner determining whether it is likely for the own vehicle and the on-coming vehicle to come proximate to each other, wherein
   the transmitted information transmitted from the lead vehicle and obtained by the other vehicle information obtainer includes proximity information regarding (i) a position of the on-coming vehicle and (ii) a change of the position of the on-coming vehicle,
   the proximity determiner determines whether it is likely for the own vehicle and the on-coming vehicle to come proximate to each other based on the proximity information,
   [A] the follow travel instructor stops conducting the lead vehicle follow control when (i) the across-boundary move determiner determines that it is likely for the lead vehicle to cross the traffic lane boundary, (ii) the on-coming vehicle determiner determines that the on-coming vehicle exists, and (iii) the proximity determiner determines that it is likely for the own vehicle and the on-coming vehicle to come proximate to each other, and
   [B] the follow travel instructor continues the lead vehicle follow control when (iii)' the proximity determiner determines that it is unlikely for the own vehicle and the on-coming vehicle to come proximate to each other, even when (i) the across-boundary move determiner determines that it is likely for the lead vehicle to cross the traffic lane boundary, and (ii) the on-coming vehicle determiner determines that the on-coming vehicle exists.

5. The vehicle controller of claim 3 further comprising:
a proximity determiner determining whether it is likely for the own vehicle and the on-coming vehicle to come proximate to each other, wherein
the transmitted information transmitted from the on-coming vehicle and obtained by the other vehicle information obtainer includes proximity information regarding (i) a position of the on-coming vehicle and (ii) a change of the position of the on-coming vehicle,
the proximity determined determines whether it is likely for the own vehicle and the on-coming vehicle to come proximate to each other based on the proximity information,
[A] the follow travel instructor stops conducting the lead vehicle follow control when (i) the across-boundary move determiner determines that it is possible for the lead vehicle to cross the traffic lane boundary, (ii) the on-coming vehicle determiner determines that the on-corning vehicle exists, and (iii) the proximity determiner determines that it is likely for the own vehicle and the on-coming vehicle to come proximate to each other, and
[B] the follow travel instructor continues to conduct the lead vehicle follow control when (iii)' the proximity determiner determines that it is unlikely for the own vehicle and the on-coming vehicle to come proximate to each other, even when (i) the across-boundary move determiner determines that it is likely for the lead vehicle to cross the traffic lane boundary, and (ii) the on-coming vehicle determiner determines that the on-coming vehicle exists.

6. The vehicle controller of claim 1, wherein
the follow travel instructor stops conducting the lead vehicle follow control when the across-boundary move determiner determines that it is likely for the lead vehicle to cross the traffic lane boundary.

7. The vehicle controller of claim 1 further comprising:
a lane keep instructor conducting a lane keep travel control by auto-steering, based on a situation of a front road of the own vehicle that is detected by a sensor of the own vehicle;
an assured detection determiner determining whether the situation of the front road of the own vehicle is assuredly detected by the sensor of the own vehicle for conducting the lane keep control; and
a first decelerator, wherein
the lane keep instructor conducts the lane keep travel control without conducting the lead vehicle follow control by the follow travel instructor, when the assured detection determiner has determined an assured detection by the sensor,
the follow travel instructor conducts the lead vehicle follow control without conducting the lane keep travel control, when the assured detection determiner determines a lack of the assured detection by the sensor, and
the first decelerator causes the own vehicle to decelerate in order to increase an inter-vehicle distance between the own vehicle and the lead vehicle, when the follow travel instructor stops conducting the lead vehicle follow control.

8. The vehicle controller of claim 1 further comprising:
a reliability determiner determining a reliability of the front situation information that is transmitted from the lead vehicle; and
a second decelerator decelerating the own vehicle to increase an inter-vehicle distance between the own vehicle and the lead vehicle, when the reliability of the front situation information determined by the reliability determiner is lower than a threshold value.

9. The vehicle controller of claim 7, wherein
the information obtained by the other vehicle information obtainer includes a vehicle width of the lead vehicle transmitted from the lead vehicle, and
the inter-vehicle distance is increased as the vehicle width of the lead vehicle obtained by the other vehicle information obtainer increases, when the first decelerator increases the inter-vehicle distance between the own vehicle and the lead vehicle by decelerating the own vehicle.

10. The vehicle controller of claim 7, wherein
the transmitted information transmitted from the lead vehicle and obtained by the other vehicle obtainer includes information regarding a shift amount of the lead vehicle in a vehicle width direction relative to a traveling lane of the own vehicle, and
the inter-vehicle distance is increased as the shift amount of the lead vehicle in the vehicle width direction increases, when the first decelerator increases the inter-vehicle distance between the own vehicle and the lead vehicle by decelerating the own vehicle.

11. The vehicle controller of claim 1 further comprising:
a notification processor notifying the information obtained by the other vehicle information obtainer, and notifying at least one of the front situation information regarding the front road of the lead vehicle, and the information regarding a possibility of the lead vehicle to cross the traffic lane boundary.

* * * * *